US012568053B2

(12) United States Patent
Kao

(10) Patent No.: US 12,568,053 B2
(45) Date of Patent: Mar. 3, 2026

(54) NETWORK SWITCH AND LINK RECOVERY METHOD FOR DUAL-HOMING THEREOF

(71) Applicant: Moxa Inc., New Taipei City (TW)

(72) Inventor: Chang-Yang Kao, New Taipei City (TW)

(73) Assignee: Moxa Inc., New Taipei City (TW)

( * ) Notice: Subject to any disclaimer, the term of this patent is extended or adjusted under 35 U.S.C. 154(b) by 304 days.

(21) Appl. No.: 18/243,693

(22) Filed: Sep. 8, 2023

(65) Prior Publication Data

US 2024/0430215 A1     Dec. 26, 2024

(30) Foreign Application Priority Data

Jun. 20, 2023    (TW) ................................. 112123137

(51) Int. Cl.
   *H04L 49/55*       (2022.01)
   *H04L 49/118*      (2022.01)

(52) U.S. Cl.
   CPC .......... *H04L 49/555* (2013.01); *H04L 49/118* (2022.05)

(58) Field of Classification Search
   CPC ... H04L 49/555; H04L 49/557; H04L 49/118; H04L 45/24; H04L 45/28; H04L 49/50; H04L 45/10; H04L 45/22; H04L 41/0663; H04L 41/0654; H04L 49/10; H04L 49/25
   See application file for complete search history.

(56) References Cited

U.S. PATENT DOCUMENTS

| | | | | |
|---|---|---|---|---|
| 6,816,467 | B1 * | 11/2004 | Muller | .................... H04L 45/48 |
| | | | | 370/256 |
| 8,208,370 | B1 * | 6/2012 | Mitchell, Jr. | ....... H04L 41/0668 |
| | | | | 370/242 |
| 8,230,115 | B2 | 7/2012 | Lee | |
| 10,164,873 | B1 | 12/2018 | Sood | |
| 10,757,041 | B2 | 8/2020 | Morris | |
| 11,005,806 | B1 * | 5/2021 | Saldanha | .............. H04L 61/103 |
| 2003/0016624 | A1 * | 1/2003 | Bare | ..................... H04L 47/125 |
| | | | | 370/252 |

(Continued)

FOREIGN PATENT DOCUMENTS

| | | |
|---|---|---|
| CN | 100484110 C | 4/2009 |
| CN | 101534211 A | 9/2009 |

(Continued)

*Primary Examiner* — Mohamed A Kamara
(74) *Attorney, Agent, or Firm* — Winston Hsu

(57) ABSTRACT

A network switch comprises a primary port, coupled to a first network device through a primary link; a backup port, coupled to a second network device through a backup link; a processing unit, configured to execute a program code; and a storage unit, coupled to the processing unit, configured to store the program code to indicate to the processing unit to execute a link recovery method for dual-homing. The link recovery method comprises receiving a plurality of first data packets via the backup port to obtain first packet information when the backup port is in a forwarding state; receiving a plurality of second data packets via the primary port to obtain second packet information in response to detecting an electrical signal from the primary link; comparing the second packet information with the first packet information to obtain a comparison result; and performing link change according to the comparison result.

12 Claims, 8 Drawing Sheets

(56)           References Cited

U.S. PATENT DOCUMENTS

| | | | |
|---|---|---|---|
| 2008/0089226 A1* | 4/2008 | Konuma ................. | H04L 69/40 |
| | | | 370/219 |
| 2008/0267081 A1 | 10/2008 | Roeck | |
| 2012/0275296 A1* | 11/2012 | Song ................... | H04L 41/0663 |
| | | | 370/225 |
| 2014/0178067 A1 | 6/2014 | Cheng | |
| 2014/0247754 A1 | 9/2014 | Venkata | |
| 2016/0037270 A1 | 2/2016 | Polinske | |
| 2021/0399941 A1 | 12/2021 | Fang | |
| 2024/0015100 A1* | 1/2024 | Jain ......................... | H04L 45/48 |

FOREIGN PATENT DOCUMENTS

| | | | |
|---|---|---|---|
| CN | 102255757 A | 11/2011 | |
| CN | 108322922 A | 7/2018 | |
| JP | 10-257580 A | 9/1998 | |
| JP | 2000-78157 A | 3/2000 | |
| WO | 2007/115493 A1 | 10/2007 | |

* cited by examiner

NETWORK SWITCH AND LINK RECOVERY METHOD FOR DUAL-HOMING THEREOF

BACKGROUND OF THE INVENTION

1. Field of the Invention

The present invention relates to a network switch and a link recovery method, and more particularly, to a network switch and a link recovery method for dual-homing thereof.

2. Description of the Prior Art

As the industry's demand for production capacity and cost efficiency grows, connecting production equipment to networks has become increasingly popular. Network connections allow for cross-machine data collection and analysis, resulting in faster, more flexible, and efficient manufacturing processes. As a result, higher quality products can be produced at lower costs. However, as reliance on networks increases, how to ensure the reliability and stability of network connections has become a concern for the industry.

To ensure stable communication between devices and the network, previous technologies have provided a path redundancy mechanism such as dual-homing to avoid the risk of network disconnection caused by the failure of a single line or a single network device. The dual-homing mechanism usually involves two physical links connecting two different ports of a network switch to different network interface controllers (NICs) of a device or to two different devices that are redundant to each other. In a dual-homing system, one of the ports of the network switch is used as a primary port to connect to the primary link and forward data packets, and the other port is used as a backup port to connect to the backup link and standby. When the primary link connected to the primary port fails (link-down), the backup link connected to the backup port has to take over the primary link for data packet forwarding until the primary link is reconnected (link-up) again.

However, methods of determining whether a link has been restored in the prior art merely depend on whether to receive an electrical signal in the physical layer (OSI L1) in general, but it is not possible to correctly determine whether the connected network device has fully resumed normal operation. In this situation, although the network switch has received the electrical signal through the link, the connected network device may not actually be able to start transmitting and receiving data. Therefore, if the network switch immediately switches the link after receiving the electrical signal through the link, the data packet may be lost, which cannot meet the application requirements of low packet loss rate.

SUMMARY OF THE INVENTION

Therefore, the present invention aims to provide a network switch and method for operating a dual-homing mechanism, which may first ensure that the connected network device has been fully resumed to operation, and then perform a link change, thereby minimizing the packet loss rate.

An embodiment of the present invention discloses a link recovery method for dual-homing for a network switch. The network switch is coupled to a first network device through a primary link via a primary port and is coupled to a second network device through a backup link via a backup port. The link recovery method includes receiving a plurality of first data packets via the backup port to obtain first packet information when the backup port is in a forwarding state; receiving a plurality of second data packets via the primary port to obtain second packet information in response to detecting an electrical signal from the primary link; comparing the second packet information with the first packet information to obtain a comparison result; and performing link change according to the comparison result.

An embodiment of the present invention further discloses a network switch. The network switch includes a primary port, a backup port, a processing unit and a storage unit. The primary port is coupled to a first network device through a primary link, and the backup port is coupled to a second network device through a backup link. The processing unit is configured to execute a program code. The storage unit is coupled to the processing unit and configured to store the program code to indicate to the processing unit to execute a link recovery method for dual-homing. The link recovery method includes receiving a plurality of first data packets via the backup port to obtain first packet information when the backup port is in a forwarding state; receiving a plurality of second data packets via the primary port to obtain second packet information in response to detecting an electrical signal from the primary link; comparing the second packet information with the first packet information to obtain a comparison result; and performing link change according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
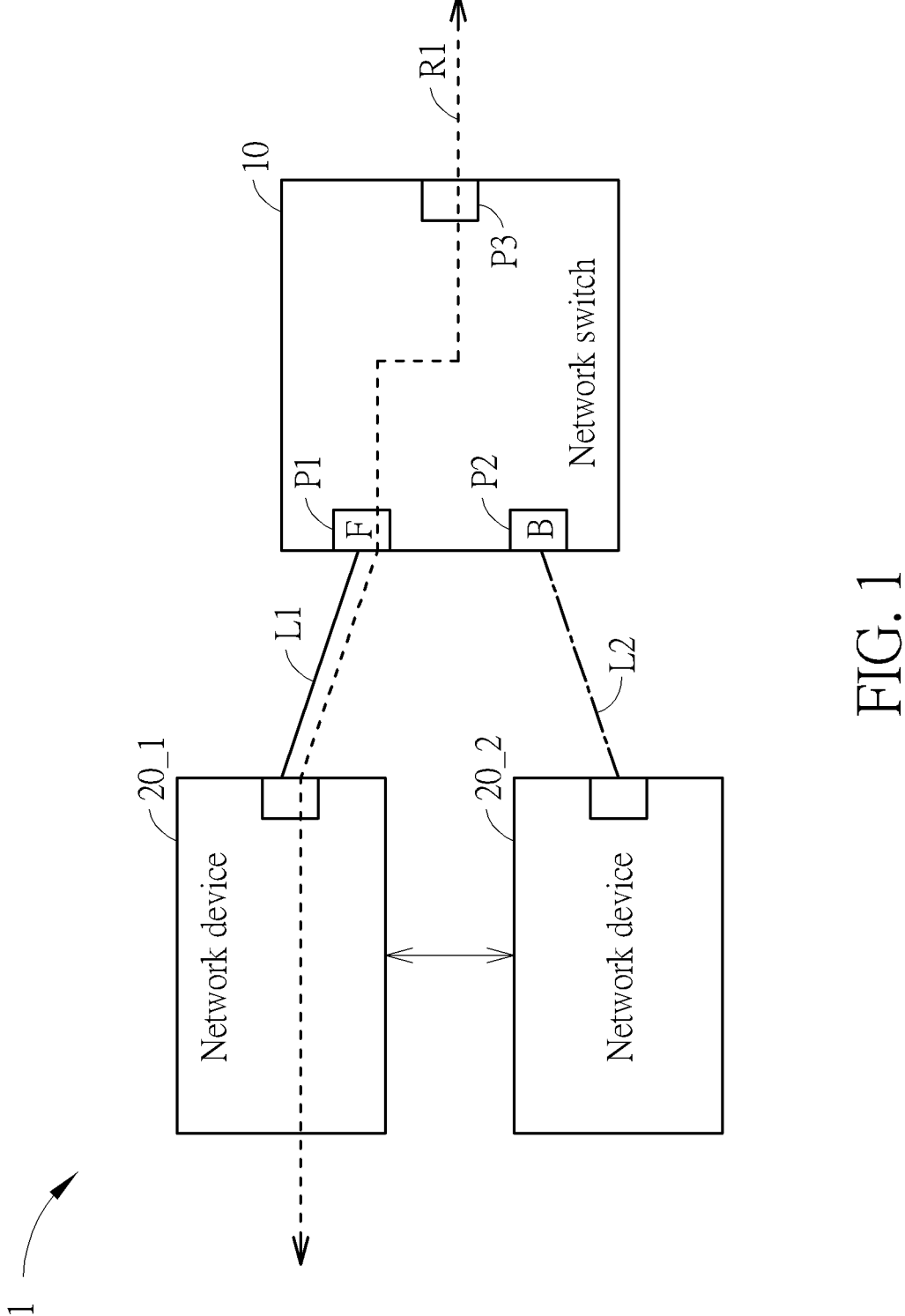
FIG. 1 is a schematic diagram of a network system.

Please refer to FIG. 1, which is a schematic diagram of a network system 1. The network system 1 comprises a network switch 10 and two network devices 20_1 and 20_2, wherein the network devices 20_1 and 20_2 are mutually backup devices, and the network switch 10 performs dual-homing redundancy mechanism thereto. Specifically, the network device 10 connects to the network device 20_1 through a primary link L1 via a primary port P1, and connects to the network device 20_2 through a backup link L2 via a backup port P2 simultaneously. As shown in FIG. 1, under normal circumstances, the network device 20_1 is used as the main operating device to transmit and receive data packets, and the network device 20_2 is used as a backup device of the network device 20_1 for standby.

Specifically, the states of the ports P1 and P2 may be a blocking state or a forwarding state. Through the port with the forwarding state, the network switch 10 is able to send and receive any type of packets, and thereby forward the data packets. On the other hand, through the port with the blocking state, the network switch 10 is only able to receive control packets and discards other types of packets received. As shown in FIG. 1, under normal circumstances, when the network device 20_1 and the primary link L1 are in normal operation, the state of the primary port P1 is the forwarding state (marked as F), and the state of the backup port P2 is the blocking state (marked as B). At this time, the data packets are transmitted via a path R1 for communication.

Figure 2:
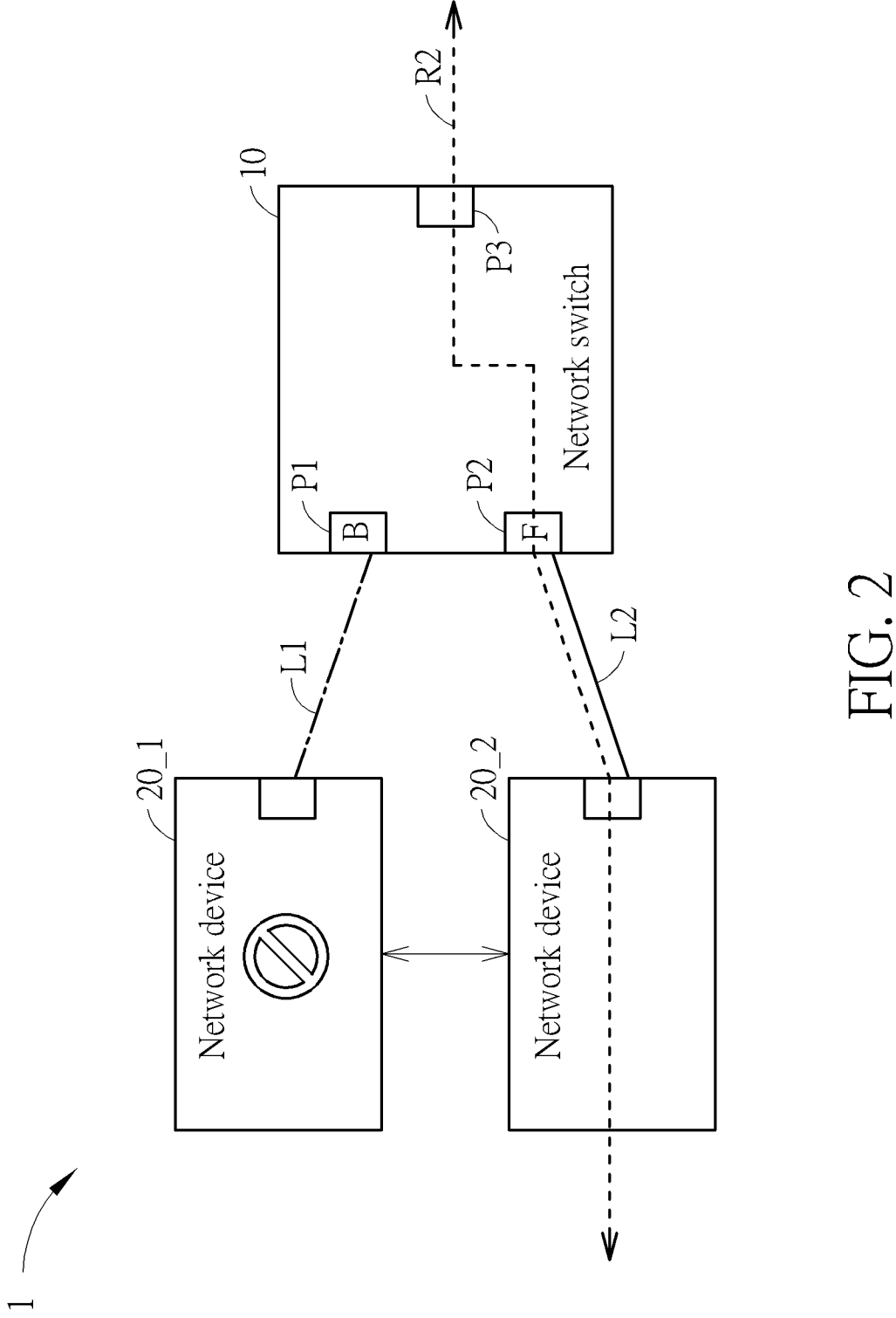
FIG. 2 is a schematic diagram of a network system performing backup mechanism.

Please refer to FIG. 2. FIG. 2 is a schematic diagram of the network system 1 performing backup mechanism, which illustrates the situation when the network device 20_1 fails. In this situation, the state of the primary port P1 of the network switch 10 will switch to the blocking state, and the state of the backup port P2 will switch to the forwarding state. In this case, the network device 20_2 will perform backup for the network device 20_1, and the backup link L2 will replace the primary link L1 for data packet forwarding. At this time, the data packets may be transmitted via a path R2 for communication. On the other hand, when the network device 20_1 resumes operation, the primary link L1 will be enabled again, returning to the operational condition shown in FIG. 1. In other words, the state of the primary port P1 will switch again to the forwarding state to resume the forwarding of data packets, and the state of the backup port P2 will switch again to the blocking state to continue standby. Accordingly, the network system 1 may resume the normal operating mode.

Figure 3:
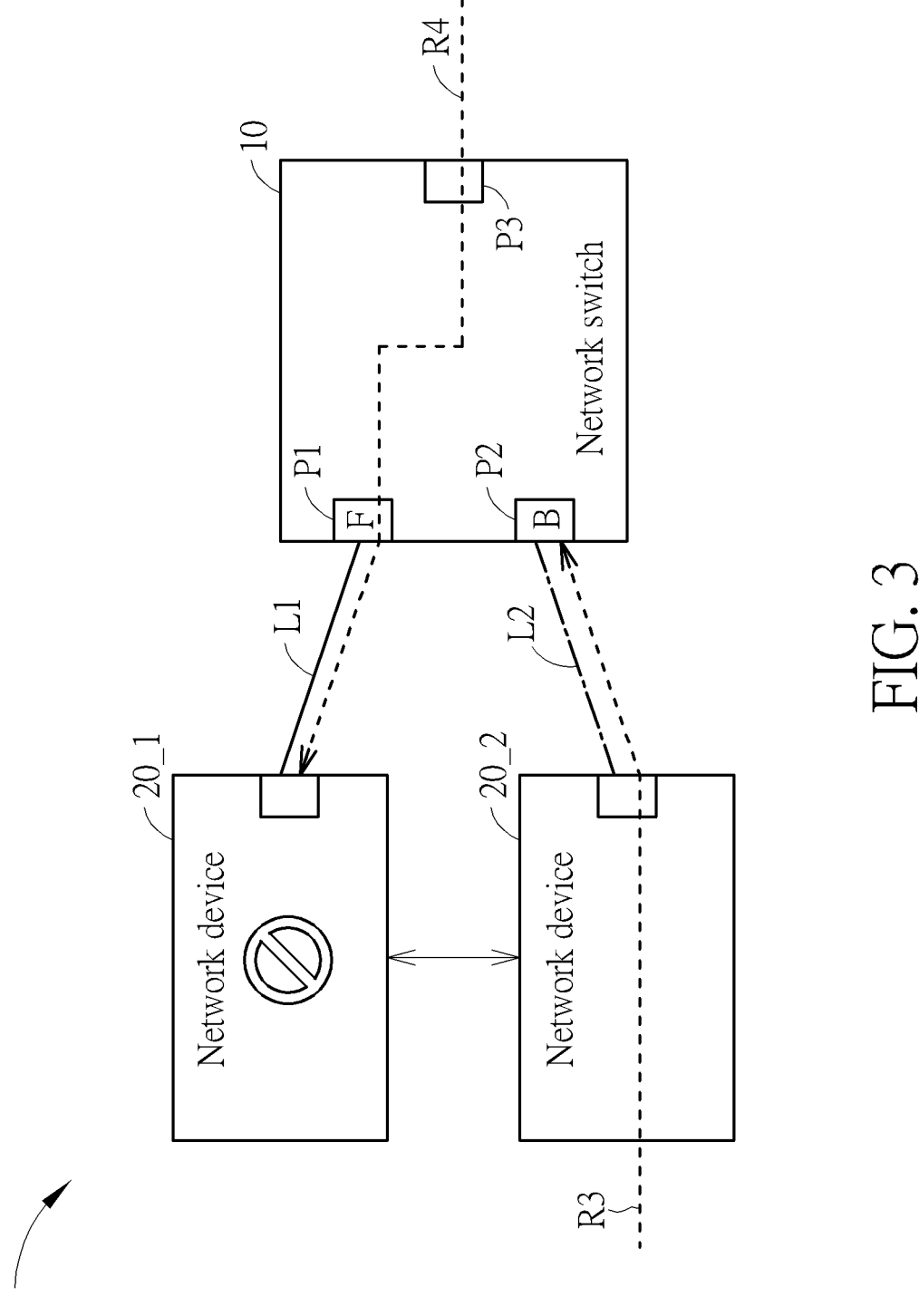
FIG. 3 is a schematic diagram of a network system performing link change too early.

In general, previous technologies determine whether to reactivate the primary link L1 to restore the general operating mode according to whether to receive the electrical signal through the primary link L1 via port P1. However, in practice, it is impossible to correctly determine whether the network device 20_1 has fully recovered to normal operation in this way. Please refer to FIG. 3, which is a schematic diagram of the network system 1 switching the link before the network device 20_1 is ready (i.e. the network device 20_1 has not fully resumed normal operation). As shown in FIG. 3, in the previous technologies, when the network switch 10 detects the electrical signal of the primary link L1, the link change will be performed immediately. At this time, the state of the primary port P1 switches to the forwarding state for data packet forwarding, while the state of the backup port P2 switches to the blocking state to continue standby. However, it should be noted that the network device 20_1 is not ready for processing the data packets at this time point, and the work handover with the standby network device 20_2 is not completed, resulting in network communication interruption. For example, downstream data may be transmitted through a path R4, where the data packets are sent to the unready network device 20_1 through the primary port P1 and the primary link L1, and therefore not processed. On the other hand, upstream data may be still transmitted through the path R3, where the data packets are sent to the backup port P2 with the blocking state through the backup link L2, and thus be discarded directly. In this situation, it will lead to serious consequences of data packet loss during this period.

Figure 4:
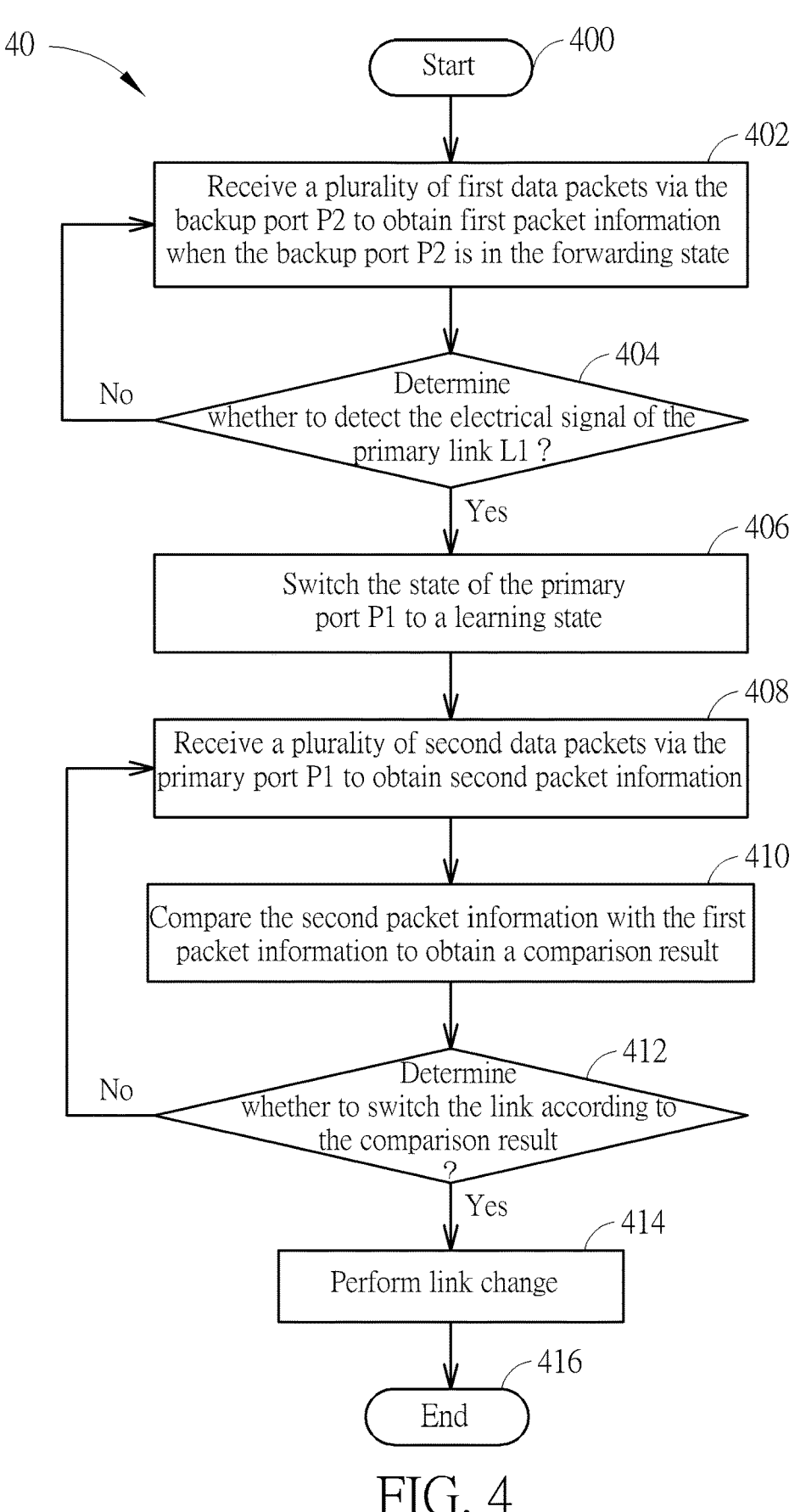
FIG. 4 is a schematic diagram of a link recovery process according to an embodiment of the present invention.

Therefore, in order to improve the defects of the prior art, the embodiment of the present invention proposes a link recovery method for dual-homing, which may detect the time when the network device 20_1 fully resumes operation, and accordingly performs a link change to restore the communication of the primary link L1. The link recovery method may be summarized into a link recovery process 40 as shown in FIG. 4. The link recovery process 40 comprises the following steps:

Step 400: Start.

Step 402: Receive a plurality of first data packets via the backup port P2 to obtain first packet information when the backup port P2 is in the forwarding state.

Step 404: Determine whether to detect the electrical signal of the primary link L1. If yes, proceed to Step 406; otherwise, proceed to Step 402.

Step 406: Switch the state of the primary port P1 to a learning state.

Step 408: Receive a plurality of second data packets via the primary port P1 to obtain second packet information.

Step 410: Compare the second packet information with the first packet information to obtain a comparison result.

Step 412: Determine whether to switch the link according to the comparison result. If yes, proceed to Step 414; otherwise, proceed to Step 408.

Step 414: Perform link change.

Step 416: End.

According to the link recovery process 40, while forwarding data packets through the backup link L2, the network switch 10 receives the plurality of first data packets via the backup port P2 to obtain first packet information (Step 402). Once the network switch 10 detects the electrical signal of the primary link L1, further determination is necessary for checking whether the network device 20_1 connected to the primary link L1 has fully resumed operation (Step 404). If no electrical signal is received from the primary link L1, the network switch 10 continues to obtain the first packet information. When the network switch 10 detects the electrical signal of the primary link L1, the network switch 10 needs to first switch the state of the primary port P1 to a learning state (Step 406). In the learning state, the primary port P1 does not forward data packets, but may receive data packets. Thus, the network switch 10 may receive a plurality of second data packets from the network device 20_1 through the primary port P1 to obtain second packet information (Step 408). Then, the network switch 10 compares the second packet information with the first packet information (Step 412), and determines whether to perform a link change (Step 414) to resume data forwarding through the primary link L1 according to the comparison results. Accordingly, the network switch 10 may wait for the network device 20_1 to fully resume operation before performing the link change.

Figure 5:
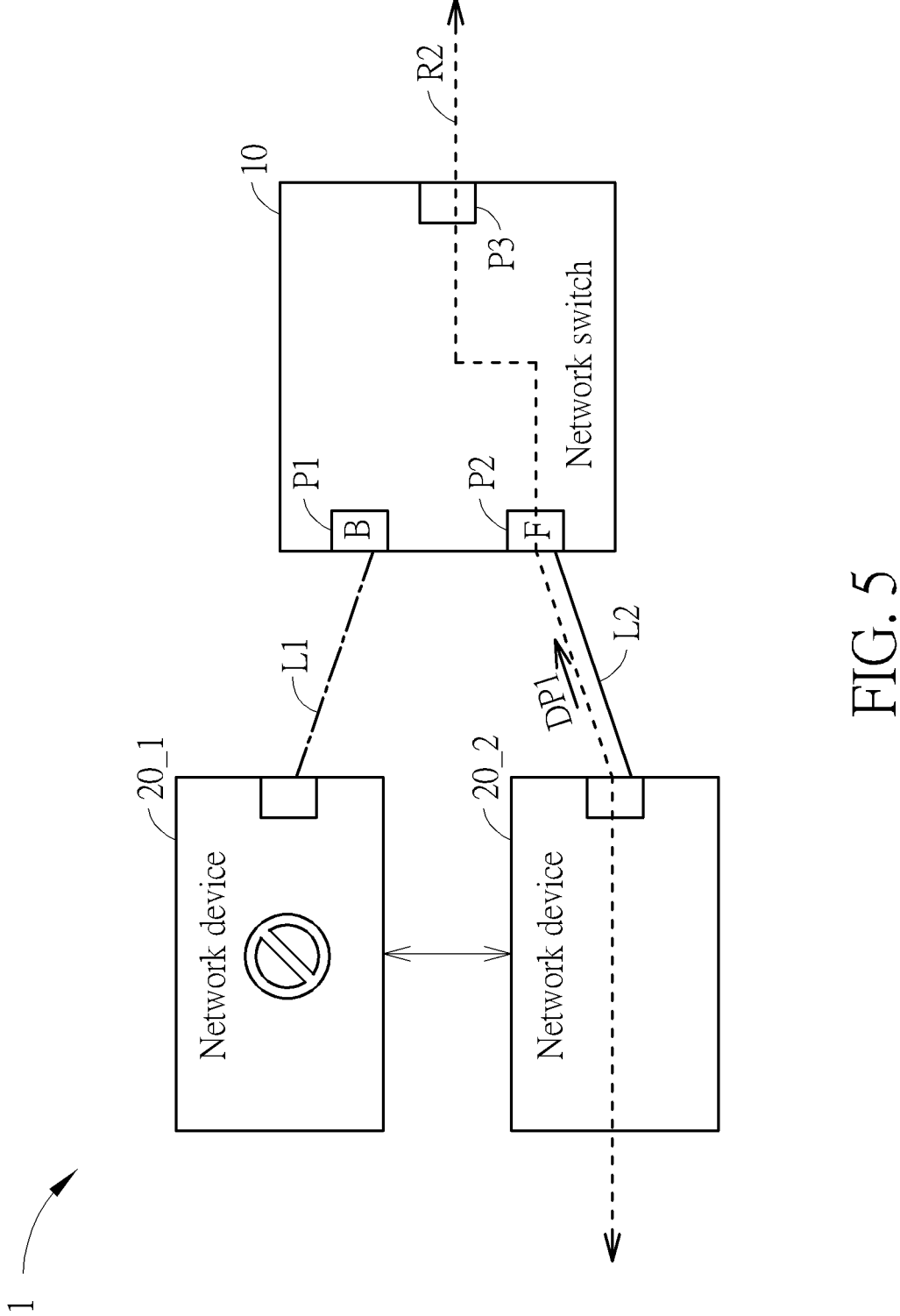
FIG. 5 is a schematic diagram of a network system performing a link recovery process according to an embodiment of the present invention.

Specifically, in Step 402, the operation of the network system 1 is as shown in FIG. 5. The data packets are transmitted between the network switch 10 and the network devices 20_2 by the path R2 through the backup port P2 and the backup link L2. In this situation, the backup port P2 is in the forwarding state, and the network switch 10 may forward the plurality of first data packets DP1 received from the network device 20_2 via the backup port P2. According to the plurality of first data packets DP1, the network switch 10 may obtain and store the first packet information. The first packet information may comprise the source Media Access Control (MAC) addresses of the plurality of first data packets DP1, and the network switch 10 may accordingly observe which MAC addresses the data packets forwarded by the network device 20_2 come from. The network switch 10 may set an aging time for the source MAC address of each packet, and only keep the information within the aging time, so as to prevent from the sudden increase of the data volume of the first packet information.

Figure 6:
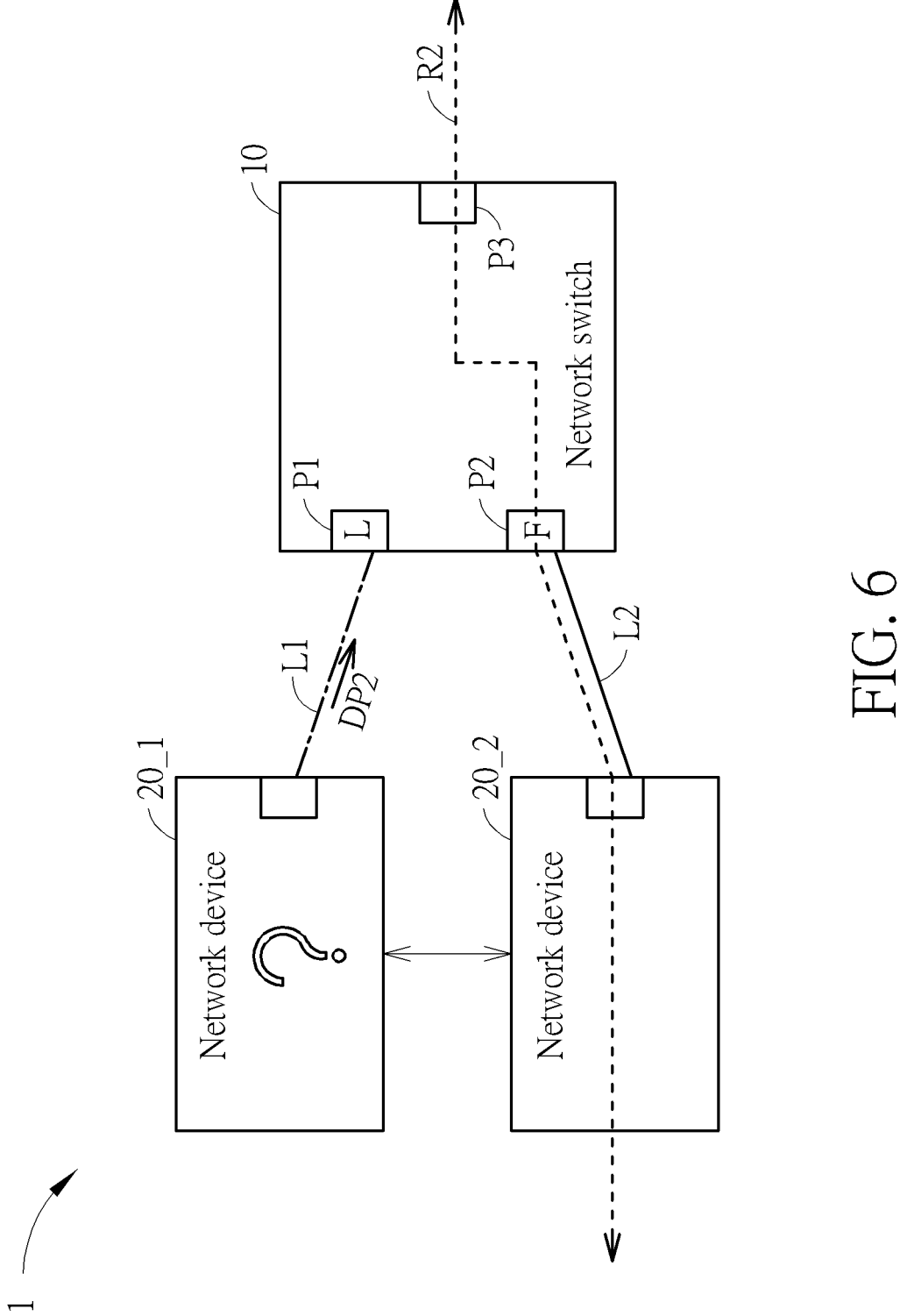
FIG. 6 is a schematic diagram of a network system performing a link recovery process according to an embodiment of the present invention.

While obtaining the first packet information, in Step 404, the network switch 10 may keep monitoring the status of the primary link L1. When detecting the electrical signal of the primary link L1, the network switch 10 switches the state of the primary port P1 to a learning state in Step 406. Please refer to FIG. 6, which is a schematic diagram of the network system 1 detecting the electrical signal of the primary link L1. As shown in FIG. 6, in this scenario, although the electrical signal of the primary link L1 has been detected, the network switch 10 still cannot obtain the operation status of the network device 20_1. Therefore, the state of the backup port P2 remains in the forwarding state, and the data packets are still transmitted through the path R2, while the primary port P1 switches into the learning state (marked as L). In comparison with the blocking state, the primary port P1 at this time may receive data packets, and is waiting to receive data packets from the network device 20_1. When the network device 20_1 resumes operation and starts to send packets, the network switch 10 may receive packets from the network device 20_1 through the primary port P1.

Please continue to refer to FIG. 6. In Step 408, when the network device 20_1 starts to resume operation, the network device 20_1 will take over work with the standby network device 20_2 and start forwarding upstream data. At the same time, although the network switch 10 does not know the operating status of the network device 20_1, the network switch 10 may successively start to receive packets from the network device 20_1 through the primary port P1. Accordingly, the network switch 10 obtains the plurality of second data packets DP2, and obtains the second packet information from the plurality of second data packets DP2. The second packet information mainly comprises the source MAC addresses of the plurality of second data packets DP2, and thereby the network switch 10 may observe which MAC addresses the data packets forwarded by the network device 20_1 come from.

In Step 410, the network switch 10 compares the second packet information obtained successively with the first packet information to obtain a comparison result. When the second packet information has the same source MAC addresses as the first packet information (i.e., the data flow originally sent through the link L2 has been changed to be sent through the primary link L1), the network switch 10 may determine that the network device 20_1 has fully resumed operation. That is to say, the network device 20_1 has completed the work handover with the network device 20_2, and has started to forward data. Accordingly, the network switch 10 may determine that a link change needs to be performed according to the comparison result. On the contrary, when the second packet information does not have the same source MAC address as the first packet information, it means that the network device 20_1 is not ready for operation. In this situation, the link change should be suspended and return to Step 408 to continue waiting for receiving the plurality of second data packets DP2.

Finally, in Step 414, the network switch 10 performs the link change. At the time, the network switch 10 has detected that the network device 20_1 has fully resumed operation by observing the source MAC addresses of the data packets, and therefore the general operation status should be restored, where the data transmission is performed by the primary port P1 and the primary link L1. In other words, the network switch 10 needs to switch the state of the backup port P2 from the forwarding state to the blocking state, and switch the state of the primary port P1 from the learning state to the forwarding state. As a result, the data packets are transmitted through the path R1 again, as shown in FIG. 1.

Accordingly, the network switch 10 detects whether the network device 20_1 has fully resumed operation by observing the source MAC addresses of the data packets, and immediately switches the path after the network device 20_1 fully resumes operation. According to the embodiment, the network switch 10 does not need to send an additional control packet to the network device 20_1 for confirmation. Therefore, the method according to the embodiment of the present invention may be applied to devices of various brands. In addition, according to the detection method in the link recovery process 40, an additional timeout is not necessary to be set to wait for the network device 20_1 to fully resume operation. Therefore, the packet loss rate caused by the time difference during restarting after a device failure may be greatly reduced.

It should be noted, in the network system 1, the network devices 20_1 and 20_2 are devices mutually backup for each other, and the network switch 10 runs dual-homing mechanism for performing backup. However, the method of the embodiment of the present invention is not limited to the one-to-two manner for device connection. For example, the network device 10 may simultaneously run the dual-homing redundancy mechanism for multiple pairs of network devices mutually backup for each other. In addition, the method of the embodiment of the present invention does not interfere with the cooperation mode between the network devices 20_1 and 20_2, but only detects according to the status of the link and the transmitted packet, so as to realize the dual-homing backup mechanism.

Figure 7:
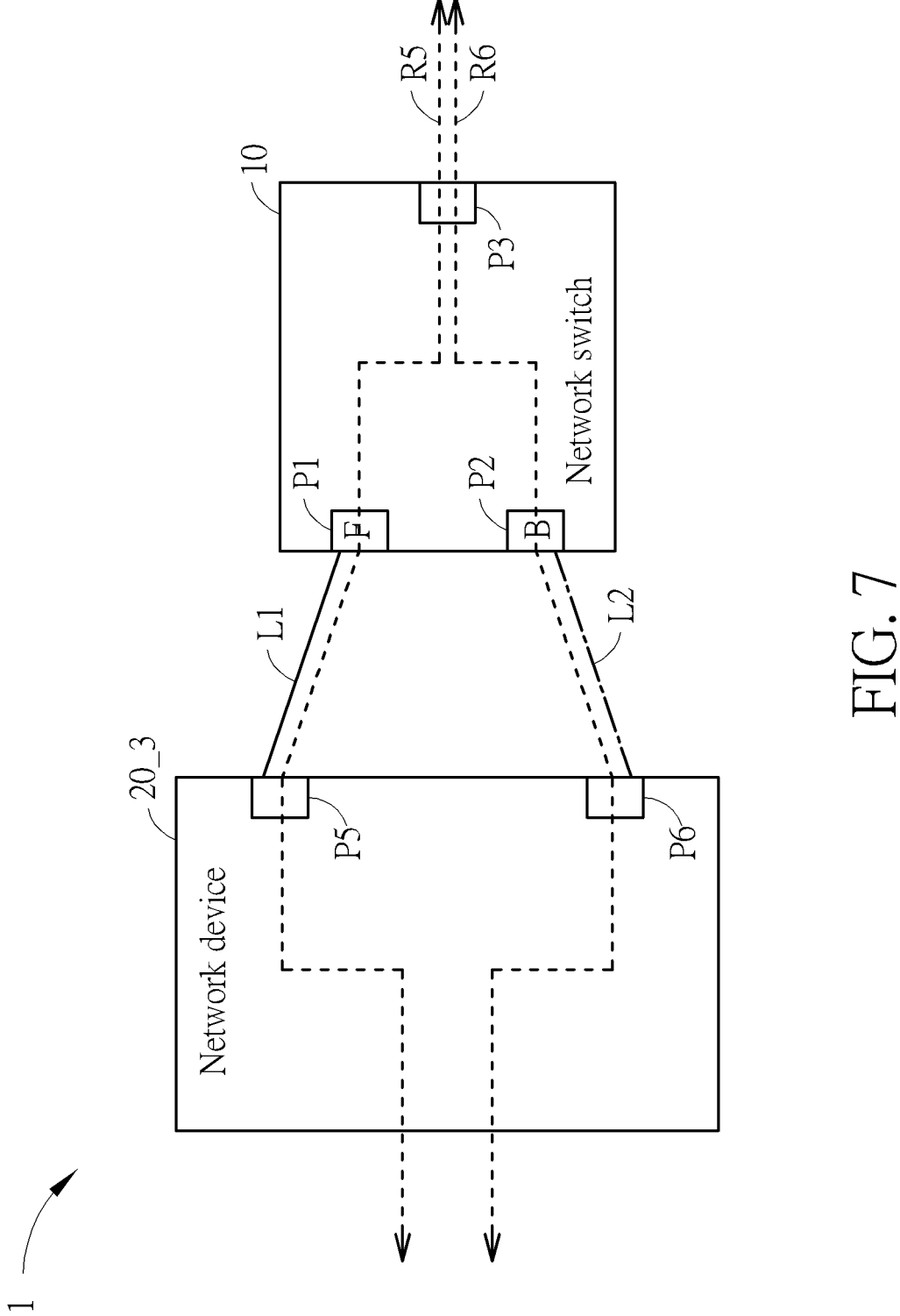
FIG. 7 is a schematic diagram of a network switch performing a dual-homing mechanism for different network interface controllers of the same device according to an embodiment of the present invention.

On the other hand, the network switch 10 may also run the dual-homing redundancy mechanism for different network interface controllers of the same device. Please refer to FIG. 7, which is a schematic diagram of the network switch 10 performing the dual-homing mechanism for different network interface controllers of the same device according to an embodiment of the present invention. As shown in FIG. 7, a network device 20_3 may be a large server with two network interface controllers (not shown in FIG. 7), and the two network interface controllers are connected to ports P5 and P6 respectively. The primary port P1 of the network switch 10 is connected to the port P5 of the network device 20_3 through the primary link L1, and the backup port P2 is connected to the port P6 through the backup link L2. In general, the data packets are transmitted through a path R5. When the network interface controller corresponding to the port P5 fails, the data packets are transmitted through a path R6 instead.

According to the link recovery process 40, when the network interface controller corresponding to the port P5 fails, the network switch 10 receives the plurality of first data packets through the backup port P2 to obtain the first packet information (Step 402). When the network interface controller corresponding to the port P5 may resume operation, the network switch 10 first detects the electrical signal of the primary link L1 via the primary port P1 (Step 404), and then switches the state of the primary port P1 to the learning state (Step 406). Next, the network switch 10 receives the plurality of second data packets through the primary port P1 to obtain the second packet information (Step 408). After comparing the second packet information with the first packet information (Step 410), the network switch 10 may determine whether the network interface controller corresponding to the port P5 has fully resumed operation (Step 412) and finally perform the link change accordingly (Step 414).

Figure 8:
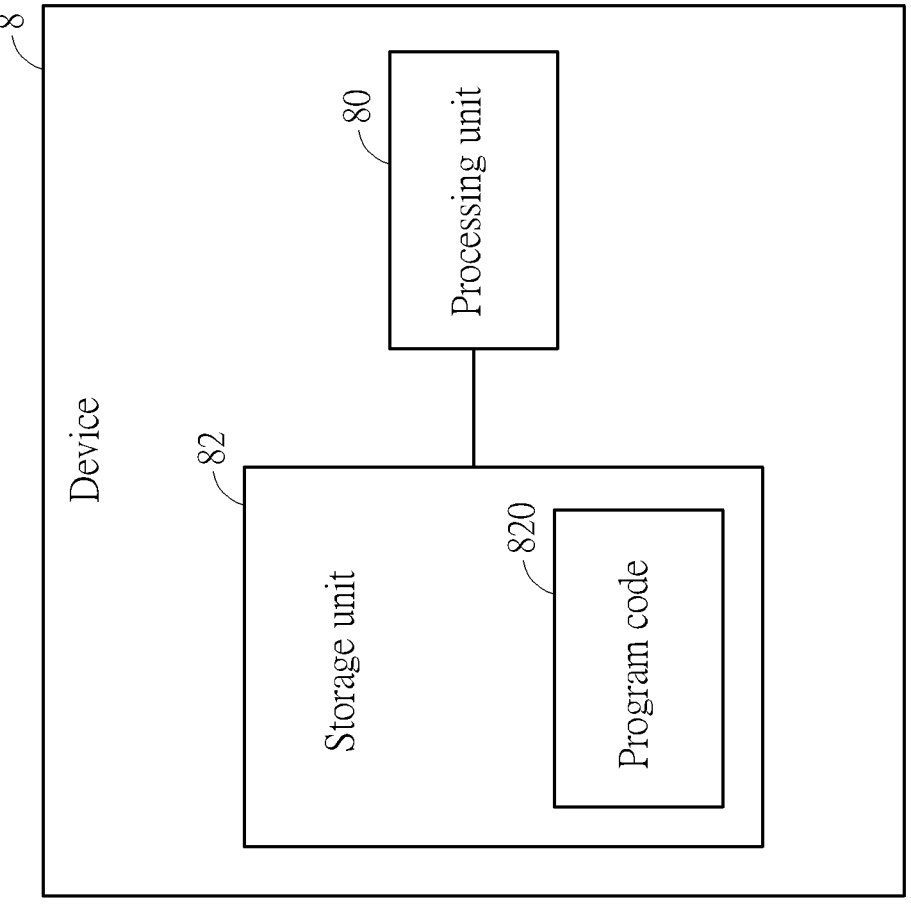
FIG. 8 is a schematic diagram of a device according to an embodiment of the present invention.

Furthermore, please refer to FIG. 8, which is a schematic diagram of a device 8 according to an embodiment of the present invention. The device 8 is used to implement the network switch 10 of the present invention. As shown in FIG. 8, the device 8 may comprise a processing unit 80 and a storage unit 82. The processing unit 80 may be a general-purpose processor, a microprocessor or an application-specific integrated circuit (ASIC) or the combinations thereof. The storage unit 82 is coupled to the processing unit 80 and may be any type of data storage devices for storing a program code 820, and the program code 820 is read and executed by the processing unit 80. For example, the storage unit 82 may be a read-only memory (ROM), a flash memory, a random-access memory (RAM), a hard disk, an optical data storage device, a non-volatile storage unit, etc., and is not limited thereto. In addition, the device 8 further comprises a plurality of ports (not shown in FIG. 8), which are respectively used to connect different devices or different network interface controllers for the dual-homing mechanism.

The network device 8 is used to represent the necessary components required to implement the embodiments of the present invention, and those skilled in the art may make various modifications and adjustments accordingly, and is not limited to this. For example, when the network device 8 is applied to implement the network device 10, the link recovery process 40 may be complied into the program code 820, stored in the storage unit 80, and executed by the processing unit 80. Moreover, the storage unit 82 is also used for storing the data such as the first packet information and the second packet information for running the link recovery method, and is not limited thereto.

In summary, the present invention provides the network switch and the link recovery method for dual-homing by observing the source MAC addresses of the data packets to detect whether the connected network device has fully resumed operation. Accordingly, the link change may be insured to be performed after the connected network device is ready, thereby minimizing the packet loss rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A link recovery method for dual-homing, used for a network switch, wherein the network switch is coupled to a first network device through a primary link via a primary port and is coupled to a second network device through a backup link via a backup port, the link recovery method comprising:

receiving a plurality of first data packets via the backup port to obtain first packet information when the backup port is in a forwarding state;

receiving a plurality of second data packets via the primary port to obtain second packet information in response to detecting an electrical signal from the primary link;

comparing the second packet information with the first packet information to obtain a comparison result; and performing link change according to the comparison result;

wherein the link recovery method further comprises switching the primary port to a learning state and receiving the plurality of second data packets via the primary port in response to detecting the electrical signal from the primary link.

2. The link recovery method of claim 1, wherein the second network device is a backup for the first network device.

3. The link recovery method of claim 1, wherein the first network device and the second network device are the same device, and the primary link and the backup link are coupled to different network interface controllers (NIC).

4. The link recovery method of claim 1, wherein the first packet information comprises source media access control (MAC) addresses of the plurality of first data packets, and the second packet information comprises source MAC addresses of the plurality of second data packets.

5. The link recovery method of claim 4, wherein the step of performing the link change according to the comparison result comprises performing the link change when the comparison result indicates that one of the source MAC addresses of the second packet information is the same as one of the source MAC addresses of the first packet information.

6. The link recovery method of claim 1, wherein the step of performing the link change according to the comparison result is switching a state of the primary port to a forwarding state and switching a state of the backup port to a blocking state.

7. A network switch, comprising:

a primary port, coupled to a first network device through a primary link;

a backup port, coupled to a second network device through a backup link;

a processing unit, configured to execute a program code; and a storage unit, coupled to the processing unit, configured to store the program code to indicate to the processing unit to execute a link recovery method for dual-homing, wherein the link recovery method comprises:

receiving a plurality of first data packets via the backup port to obtain first packet information when the backup port is in a forwarding state;

receiving a plurality of second data packets via the primary port to obtain second packet information in response to detecting an electrical signal from the primary link;

comparing the second packet information with the first packet information to obtain a comparison result; and performing link change according to the comparison result;

wherein the link recovery method further comprises switching the primary port to a learning state and receiving the plurality of second data packets via the primary port in response to detecting the electrical signal from the primary link.

8. The network switch of claim 7, wherein the second network device is a backup for the first network device.

9. The network switch of claim 7, wherein the first network device and the second network device are the same device, and the primary link and the backup link are coupled to different network interface controllers (NIC).

10. The network switch of claim 7, wherein the first packet information comprises source media access control (MAC) addresses of the plurality of first data packets, and the second packet information comprises source MAC addresses of the plurality of second data packets.

11. The network switch of claim 10, wherein the step of performing the link change according to the comparison result comprises performing the link change when the comparison result indicates that one of the source MAC addresses of the second packet information is the same as one of the source MAC addresses of the first packet information.

12. The network switch of claim 7, wherein the step of performing the link change according to the comparison result is switching a state of the primary port to a forwarding state and switching a state of the backup port to a blocking state.

* * * * *